United States Patent
Tokuda et al.

(10) Patent No.: US 9,209,457 B2
(45) Date of Patent: Dec. 8, 2015

(54) ALKALINE STORAGE BATTERY (75) Inventors: Mitsunori Tokuda, Moriguchi (JP);
Makoto Ochi, Moriguchi (JP);
Kazuhiro Kitaoka, Moriguchi (JP);
Masao Takee, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 127 days.

(21) Appl. No.: 13/989,958

(22) PCT Filed: Nov. 29, 2011

(86) PCT No.: PCT/JP2011/077480
§ 371 (c)(1),
(2), (4) Date: Jul. 19, 2013

(87) PCT Pub. No.: WO2012/073933
PCT Pub. Date: Jun. 7, 2012

(65) Prior Publication Data
US 2013/0295460 A1    Nov. 7, 2013

(30) Foreign Application Priority Data

Nov. 30, 2010   (JP) ................................. 2010-266191
Nov. 28, 2011   (JP) ................................. 2011-258562

(51) Int. Cl.
*H01M 4/525*   (2010.01)
*H01M 4/38*    (2006.01)
*H01M 4/24*    (2006.01)
*H01M 4/32*    (2006.01)
*H01M 4/36*    (2006.01)
(Continued)

(52) U.S. Cl.
CPC .............. *H01M 4/383* (2013.01); *H01M 4/242* (2013.01); *H01M 4/32* (2013.01); *H01M 4/362* (2013.01); *H01M 4/626* (2013.01); *H01M 10/345* (2013.01); *Y02E 60/124* (2013.01)

(58) Field of Classification Search
CPC ....... H01M 4/383; H01M 4/242; H01M 4/32; H01M 4/362; H01M 4/626; H01M 10/345
See application file for complete search history.

(56) References Cited

U.S. PATENT DOCUMENTS

2002/0164527 A1   11/2002   Tanigawa et al.
2008/0292960 A1   11/2008   Noya et al.

FOREIGN PATENT DOCUMENTS

| CN | 1375885 A | 10/2002 |
|---|---|---|
| CN | 101134600 A | 3/2008 |

(Continued)

OTHER PUBLICATIONS

International Search Report of PCT/JP2011/077480, mailing date of Mar. 6, 2012; With English translation.

*Primary Examiner* — Helen O Conley
(74) *Attorney, Agent, or Firm* — Westerman, Hattori, Daniels & Adrian, LLP (57) ABSTRACT

[Problem] To suppress increases in the resistance of nickel positive electrodes and assure sufficient battery capacity even after repeated pulse charging and discharging cycles with a large current. [Solution] This alkaline storage battery (10) contains aluminum (Al) in a hydrogen storage alloy negative electrode (12) and also includes Al in a nickel positive electrode (11). In a state where a prescribed charging and discharging cycle has completed, the Al content in the nickel positive electrode (11) is 0.25% by mass or greater of that in the positive electrode active material, and in powder x-ray diffraction of the positive electrode active material using Cu—K$\alpha$, the half-width of the (101) plane peak for Ni(OH)$_2$ is controlled so as to be 0.5 (°/2$\theta$) or greater.

11 Claims, 5 Drawing Sheets

(51) Int. Cl.
*H01M 4/62* (2006.01)
*H01M 10/34* (2006.01)

(56) References Cited

FOREIGN PATENT DOCUMENTS

| | | | |
|---|---|---|---|
| DE | 44 29 273 | A1 | 2/1995 |
| DE | 44 29 273 | B4 | 9/2005 |
| DE | 602 13 017 | T2 | 12/2006 |
| EP | 1 241 721 | A2 | 9/2002 |
| EP | 1 892 220 | A1 | 2/2008 |
| JP | 04-328257 | A | 11/1992 |
| JP | 07-057730 | A | 3/1995 |
| JP | 10-172561 | A | 6/1998 |
| JP | 2002-270167 | A | 9/2002 |
| JP | 2003-187793 | A | 7/2003 |
| JP | 2008-053222 | A | 3/2008 |

FIG. 1

ALKALINE STORAGE BATTERY

TECHNICAL FIELD

The present invention relates to an alkaline storage battery suitably used for vehicles such as hybrid electric vehicles (HEVs), and in particular, relates to an alkaline storage battery including a sealed battery container that stores an electrode group including a hydrogen storage alloy negative electrode having a hydrogen storage alloy as a negative electrode active material, a nickel positive electrode having nickel hydroxide as a main component of a positive electrode active material, and a separator and also stores an alkaline electrolyte.

BACKGROUND ART

Secondary batteries are now employed in various products such as cell phones, personal computers, power tools, and hybrid electric vehicles (HEVs), and for these applications, an alkaline storage battery is used. Such an alkaline storage battery uses, as a negative electrode active material, a hydrogen storage alloy having an aluminum (Al)-containing composition that achieves excellent stability in the crystal structure even after repeated charging and discharging cycles.

A nickel positive electrode typically uses nickel hydroxide $(Ni(OH)_2)$ as a main component of the positive electrode active material. To meet the recent demand for much higher capacity, for example, Patent Document 1 (JP-A-10-172561) has disclosed adding aluminum (Al) to nickel hydroxide $(Ni(OH)_2)$.

RELATED ART DOCUMENTS

Patent Document

Patent Document 1: JP-A-10-172561

DISCLOSURE OF INVENTION

Problem to be Solved by the Invention

In a hybrid electric vehicle (HEV) or other products using an alkaline storage battery that includes a hydrogen storage alloy negative electrode having a hydrogen storage alloy containing aluminum (Al) as the negative electrode active material and a nickel positive electrode having nickel hydroxide $(Ni(OH)_2)$ containing aluminum (Al) as the positive electrode active material, a pulse charging and discharging cycle is repeated with a large current. Such repeated pulse charging and discharging cycles with a large current cause problems that have not been serious in the application for conventional consumer appliances. Specifically, repeating a pulse charging and discharging cycle with a large current in a product such as an HEV makes an increase in the internal resistance of a battery non-negligible, and the increased internal resistance causes a problem of reduction in the battery capacity.

The reason for this is as follows: repeating a charging and discharging cycle in such an alkaline storage battery causes an aluminum (Al) component in the hydrogen storage alloy to be dissolved in an alkaline electrolyte; and repeating a pulse charging and discharging cycle with a large current markedly increases the amount of the aluminum (Al) component dissolved. A larger amount of the aluminum (Al) component dissolved in the alkaline electrolyte as above increases the aluminum (Al) content in the positive electrode active material as the counter electrode. Furthermore, a larger aluminum (Al) content in the positive electrode active material increases the resistance value of the nickel positive electrode, resulting in reduction in the battery capacity.

To address this problem, the inventors of the present invention have studied the factor increasing the resistance value of the nickel positive electrode by disassembling an alkaline storage battery after repeated pulse charging and discharging cycles with a large current. As a result, it has been revealed that the positive electrode active material contains an aluminum (Al) component in a larger amount than the initial amount. In addition, powder x-ray diffraction analysis has revealed a reduced half-width of the (101) plane peak for nickel hydroxide $(Ni(OH)_2)$ as the positive electrode active material and higher crystallizability of nickel hydroxide $(Ni(OH)_2)$ as the positive electrode active material. These results show the reason for the increase in resistance value of the nickel positive electrode.

Furthermore, in the result of the powder x-ray diffraction analysis of the positive electrode active material with which the increase in the resistance value of the nickel positive electrode is suppressed, the half-width of the (001) plane peak is larger than the half-width of the (100) plane peak. This suggests that the crystallizability is lower in the c-axis direction than that in the a-axis direction in the crystal lattice of nickel hydroxide $(Ni(OH)_2)$. In other words, it is supposed that a lower crystallizability in the c-axis direction than that in the a-axis direction in nickel hydroxide $(Ni(OH)_2)$, which is known to have a laminated crystal structure in the c-axis direction, allows electrons to readily move between layers, thereby reducing the resistance.

The invention has an object to suppress the increase in resistance of the nickel positive electrode and to ensure sufficient battery capacity even after repeated pulse charging and discharging cycles with a large current.

Means for Solving Problem

An alkaline storage battery of the invention includes a sealed battery container storing an electrode group and an alkaline electrolyte. The electrode group includes a hydrogen storage alloy negative electrode having a hydrogen storage alloy as a negative electrode active material, a nickel positive electrode having nickel hydroxide as a main component of a positive electrode active material, and a separator. To achieve the object, the hydrogen storage alloy negative electrode contains aluminum (Al); the nickel positive electrode also contains aluminum (Al); the aluminum (Al) content in the nickel positive electrode is 0.25% by mass or greater with respect to the mass of the positive electrode active material; and the half-width of the (101) plane peak for $Ni(OH)_2$ is controlled to be 0.5 (°/2θ) or greater in powder X-ray diffraction of the positive electrode active material using Cu—Kα. Furthermore, the half-width of the (001) plane peak for $Ni(OH)_2$ is controlled to be larger than the half-width of the (100) plane peak in powder X-ray diffraction of the nickel positive electrode using Cu—Kα.

It has been found that even when the aluminum (Al) content in a positive electrode active material layer, which affects the positive electrode resistance, is 0.25% by mass or greater with respect to the mass of the positive electrode active material, the increase in the positive electrode resistance can be suppressed by controlling the relation of the aluminum (Al) content and the half-width for nickel hydroxide $(Ni(OH)_2)$ as the positive electrode active material. In this case, when the aluminum (Al) content in the positive electrode active material is 0.25% by mass or greater and the half-width of the (101) plane peak for nickel hydroxide $(Ni(OH)_2)$ as the positive electrode active material is less than 0.5 (°/2θ) in powder X-ray diffraction using Cu—Kα, such a small half-width of the positive electrode active material means high crystallizability, resulting in a high positive electrode resistance. As a result, the battery capacity is insufficient after charging and discharging cycles.

In contrast, when the aluminum (Al) content in the positive electrode active material is 0.25% by mass or greater and the half-width of the (101) plane peak for nickel hydroxide (Ni(OH)$_2$) as the positive electrode active material is 0.5 (°/2θ) or greater in powder X-ray diffraction using Cu—Kα, such a large half-width of the positive electrode active material means low crystallizability, which suppresses the increase in the positive electrode resistance. As a result, the battery capacity is sufficient after charging and discharging cycles.

Here, it is desirable that the nickel positive electrode contain zinc (Zn) at a content of 0.05% by mass or less with respect to the nickel (Ni) atom of nickel hydroxide (Ni(OH)$_2$) as the positive electrode active material. This is because the following results have been obtained: a nickel positive electrode containing zinc (Zn) at a small content of 0.05% by mass or less with respect to the nickel (Ni) atom of nickel hydroxide (Ni(OH)$_2$) has low crystallizability of nickel hydroxide (Ni(OH)$_2$) and this achieves a marked effect of suppressing the increase in positive electrode resistance even after a charging and discharging cycle test. In contrast, a nickel positive electrode containing zinc (Zn) at a content of more than 0.05% by mass with respect to the nickel (Ni) atom of nickel hydroxide (Ni(OH)$_2$) increases the crystallizability of nickel hydroxide (Ni(OH)$_2$), and the high crystallizability is maintained even after a charging and discharging cycle test, thereby failing to suppress the increase in positive electrode resistance.

It is preferable that the half-width of the (001) plane peak for nickel hydroxide (Ni(OH)$_2$) be larger than the half-width of the (100) plane peak in powder X-ray diffraction of the positive electrode active material using Cu—Kα because the increase in resistance of the nickel positive electrode is suppressed.

In this case, it is desirable that the aluminum (Al) content gradually decrease from the surface of the nickel positive electrode toward the inside. Furthermore, it is desirable that the nickel positive electrode include a layer containing aluminum (Al) from the surface of the positive electrode to a particular position.

Effect of the Invention

The present invention can suppress the capacity reduction due to the increase in resistance of the nickel positive electrode even after repeated charging and discharging cycles when the aluminum (Al) content in the positive electrode active material layer is 0.25% by mass or greater with respect to the mass of the positive electrode active material, by controlling the relation of the aluminum (Al) content and the half-width of the (101) plane peak for nickel hydroxide (Ni(OH)$_2$) as the positive electrode active material.

BEST MODE(S) FOR CARRYING OUT THE INVENTION

Embodiments of the invention will next be described in detail hereinafter, but the invention is not limited to the embodiments. Various changes and modifications may be made as appropriate in the invention without departing from the spirit and scope of the invention.

1. Nickel Positive Electrode

Figure 1:
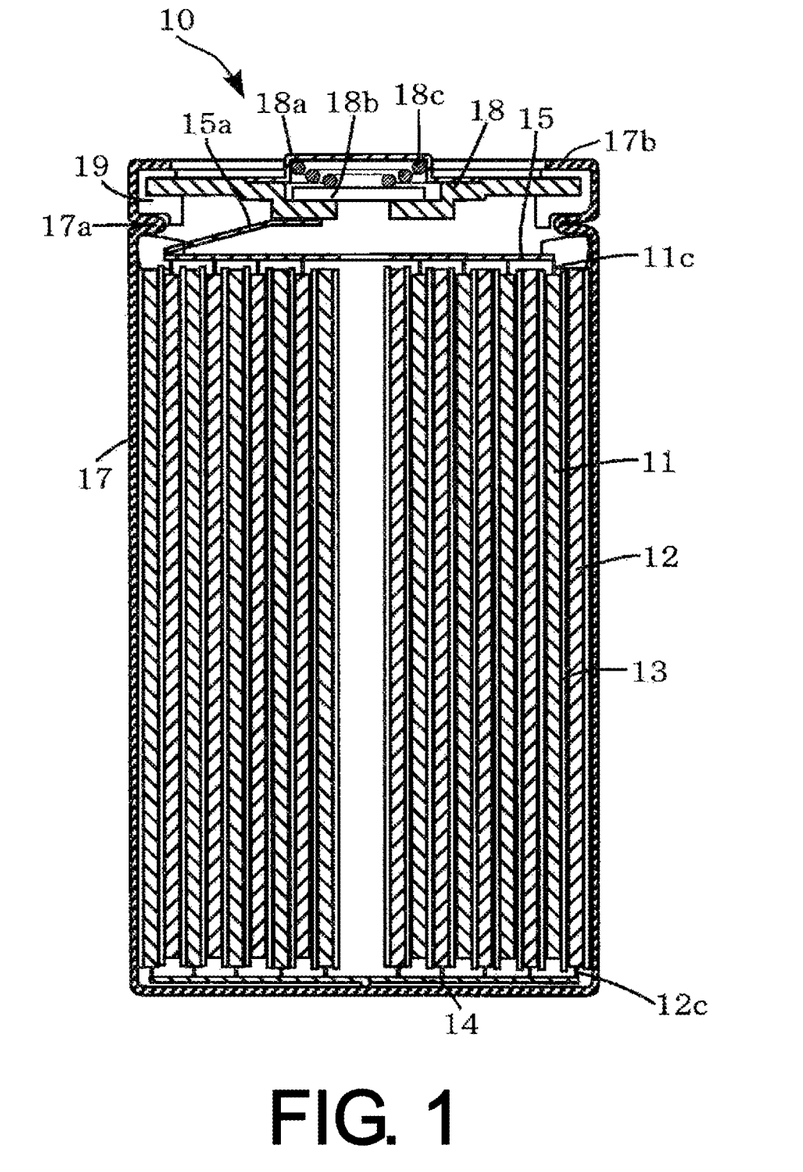
FIG. 1 is a schematic sectional view showing a nickel-hydrogen storage battery as an example of an alkaline storage battery of the invention.

A nickel positive electrode 11 was prepared by filling pores of a nickel sintered substrate with nickel hydroxide and aluminum hydroxide in particular amounts. In this case, the nickel sintered substrate used was prepared as below. For example, methylcellulose (MC) as a thickener, polymeric hollow microspheres (having a pore size of 60 μm, for example), and water were mixed with nickel powder, and the mixture was kneaded, thus preparing a nickel slurry. Next, the nickel slurry was applied to both faces of a punching metal using a nickel plated steel plate so as to give a particular thickness. Subsequently, the coated plate was heated in a reducing atmosphere at 1000° C., thereby removing the thickener and the polymeric hollow microspheres and sintering the nickel powder. Consequently, the nickel sintered substrate having a porosity of about 80% was obtained.

Next, the following treatments were repeated predetermined times: impregnation treatment of impregnating the obtained nickel sintered substrate having a porosity of about 80% with an impregnating solution as below; and alkaline treatment with an alkaline treatment solution were repeated predetermined times. The pores in the nickel sintered substrate were thus filled with nickel hydroxide and aluminum hydroxide in particular amounts. Subsequently, the substrate was cut into a particular size to yield a sintered nickel positive electrode 11 filled with the positive electrode active material. In this case, the used impregnating solution was a mixed nitrate solution prepared by mixing nickel nitrate, aluminum nitrate, and zinc nitrate at a particular molar ratio (for example, 100:5:5). The used alkaline treatment solution was an aqueous sodium hydroxide (NaOH) solution having a specific gravity of 1.3.

The nickel sintered substrate was immersed in the impregnating solution, and thus the pores of the nickel sintered substrate were impregnated with the impregnating solution. Subsequently, the substrate was dried and then immersed in the alkaline treatment solution, thereby performing the alkaline treatment. This allows the nickel salt and the aluminum salt to be converted into nickel hydroxide and aluminum hydroxide. Next, the substrate was sufficiently washed with water to remove the alkaline solution and then was dried. Such a series of filling operations of the positive electrode active material, which includes impregnation with the impregnating solution, drying, immersion in the alkaline treatment solution, water washing, and drying, was repeated five times, thereby filling a particular amount of the positive electrode active material to the nickel sintered substrate.

Here, the aluminum (Al) content in the positive electrode active material gradually decreases from the surface of the nickel positive electrode toward the inside by increasing the concentration of aluminum nitrate in the mixed nitrate solution step by step in the series of impregnation processes. Moreover, a layer containing aluminum (Al) is formed only on the surface of the nickel positive electrode by immersing the nickel sintered substrate in a nitrate solution containing only aluminum nitrate after the last impregnation in the series of impregnation processes.

2. Hydrogen Storage Alloy Negative Electrode

A hydrogen storage alloy negative electrode 12 was prepared by applying a hydrogen storage alloy slurry to a negative electrode substrate formed using a punching metal. In this case, for example, the crystal structure of a hydrogen storage alloy ingot was adjusted by heat treatment of the ingot in an argon gas atmosphere. The ingot was then mechanically pulverized in an inert atmosphere to yield hydrogen storage alloy powder. Subsequently, 0.5 parts by mass of styrene-butadiene rubber (SBR) as a water-insoluble polymer binding agent, 0.03 parts by mass of carboxymethylcellulose (CMC) as a thickener, and an appropriate amount of pure water were added to 100 parts by mass of the obtained hydrogen storage alloy powder, and the mixture was kneaded, thus preparing a hydrogen storage alloy slurry. Next, the obtained hydrogen storage alloy slurry was applied onto both faces of a negative electrode substrate formed using a punching metal (made of a nickel coated steel plate). Subsequently, the substrate was dried, then rolled so as to give a particular packing density, and cut into a particular size to yield a hydrogen storage alloy negative electrode 12.

The hydrogen storage alloy used had a general formula of $La_{0.6}Sm_{0.4}Mg_{0.1}Ni_{3.6}Al_{0.05}$ (the stoichiometric ratio of B component (molar ratio of Ni and Al) with respect to A component (molar ratio of La, Sm and Mg) was 3.3 ($AB_{3.3}$)). The hydrogen storage alloy negative electrode prepared had a length of 1000 mm, a height (width) of 50 mm, and a thickness of 0.20 mm.

3. Nickel-Hydrogen Storage Battery

Next, a separator 13 formed using polyolefin nonwoven fabric was interposed between the nickel positive electrode 11 and the hydrogen storage alloy negative electrode 12 prepared as above, and the whole was wound spirally to yield a spiral electrode group. The spiral electrode group prepared as above exposes a substrate exposed portion 11c of the nickel positive electrode 11 from the upper part and exposes a substrate exposed portion 12c of the hydrogen storage alloy electrode 12 from the lower part. Next, a negative electrode collector 14 was welded to the substrate exposed portion 12c exposed from the lower end face of the obtained spiral electrode group, and a positive electrode collector 15 was welded on the substrate exposed portion 11c of the nickel electrode 11 exposed from the upper end face of the spiral electrode group, thereby preparing an electrode assembly.

The obtained electrode assembly was stored in a bottomed cylindrical outer can 17 formed by coating iron with nickel (an outer surface of the bottom face serves as an external negative electrode terminal), and the negative electrode collector 14 was welded to an inner bottom face of the outer can 17. A collector lead portion 15a led from the positive electrode collector 15 was welded to a bottom part of a sealing plate 18 that also served as a positive electrode terminal and had an insulating gasket 19 on a peripheral part thereof. Here, the sealing plate 18 has a positive electrode cap 18a. Inside the positive electrode cap 18a, a pressure valve (not shown) is arranged including a valve element 18b that deforms with a particular pressure and springs 18c.

Next, an annular groove 17a was formed on the upper peripheral part of the outer can 17, then an alkaline electrolyte was poured, and the insulating gasket 19 installed to the peripheral part of the sealing plate 18 was mounted above the annular groove 17a formed on the upper part of the outer can 17. Subsequently, an open end 17b of the outer can 17 was crimped, thereby producing a nickel-hydrogen storage battery 10 having a nominal capacity of 6 Ah (a diameter of 32 mm and a height of 60 mm).

The nickel-hydrogen storage battery 10 produced as above was subjected to charge at a charging current of 1 It to 110% of the theoretical capacity, then was subjected to discharge at a discharging current of 1 It until the battery voltage reached 0.9 V. The initial battery capacity was determined from the discharge time, resulting in 6 Ah. Concurrently, the internal resistance value (direct-current resistance value: DCR) after the discharge was determined, resulting in 0.97 mΩ. The nickel-hydrogen storage battery 10 after the discharge was disassembled to take out the nickel positive electrode 11. Subsequently, the positive electrode active material was removed from the nickel positive electrode 11 and then was analyzed with a powder X-ray diffractometer (XRD) using Cu—Kα. As a result, the half-width of the (101) plane peak was 0.75 (°/2θ), the half-width of the (100) plane peak was 0.76 (°/2θ), the half-width of the (001) plane peak was 0.68 (°/2θ), and the ratio of the half-width of the (001) plane peak with respect to the half-width of the (100) plane peak ((001) plane/(100) plane) was 0.89, for $Ni(OH)_2$. In addition, the removed positive electrode active material was analyzed with an inductively coupled plasma (ICP) emission spectrometer to determine the aluminum (Al) content and the zinc (Zn) content in the positive electrode active material. As a result, the aluminum (Al) content was 0.14% by mass of the mass of the positive electrode active material, and the zinc (Zn) content was 0.05% by mass with respect to the nickel (Ni) atom of nickel hydroxide as the positive electrode active material.

4. Battery Test (Charging and Discharging Cycle Test and Storage Test)

Next, with the nickel-hydrogen storage battery 10 produced as above, a partial charging and discharging cycle test (a cycle test in which a battery was subjected to charge at a charging current of 10 It to a voltage at which the state of charge (SOC) reached 90% and then was subjected to discharge at a discharging current of 10 It to a voltage at which SOC reached 20%) was performed in a temperature environment at 45° C. in a range of 20 to 90% of SOC of the battery capacity. Such a partial charging and discharging cycle was repeated over a particular period of time.

Here, a battery without the partial charging and discharging cycle test was regarded as battery A. A battery subjected to the partial charging and discharging cycle test for a month was regarded as battery B1. Likewise, a battery subjected to the partial charging and discharging cycle test for three months was regarded as battery B2; a battery subjected to the partial charging and discharging cycle test for four months as battery B3; a battery subjected to the partial charging and discharging cycle test for five months as battery B4; and a battery subjected to the partial charging and discharging cycle test for six months as battery B5.

Next, each internal resistance value (direct-current resistance value: DCR) of the nickel-hydrogen storage batteries B1 to B5 after the charging and discharging cycle test as above was determined, and the ratio to the internal resistance value (direct-current resistance value: DCR) previously determined of the battery A was determined. Table 1 shows the results. After the charging and discharging cycle test as above, these batteries B1 to B5 were subjected to charge at a charging current of 1 It to SOC of 110%, and then were subjected to discharge at a discharging current of 1 It until the battery voltage reached 0.9 V. The battery capacity after the charging and discharging cycle test was determined from the discharge time, and the ratio to the initial capacity previously determined was determined as the initial capacity ratio (ratio with respect to the battery A). Table 1 shows the results. Next, the nickel-hydrogen storage batteries B1 to B5 were disassembled, and the positive electrode active material of each battery was removed from the nickel positive electrode 11 in a similar method to the above. Subsequently, X-ray diffraction analysis using XRD and ICP analysis were performed to determine the half-width of the (101) plane peak, the half-width of the (100) plane peak, the half-width of the (001) plane peak, the ratio of the half-width of the (001) plane peak with respect to the half-width of the (100) plane peak, for Ni(OH)$_2$, and the aluminum (Al) content with respect to the mass of the positive electrode active material. Table 1 shows the results.

Separately, batteries were subjected to the partial charging and discharging cycle test as above, then were subjected to charge to a voltage at which SOC reached 10% with respect to the initial capacity, and were subjected to a storage test in which they were left in a particular temperature atmosphere. These batteries were regarded as batteries C1 to C7. In this case, the battery C1 was subjected to the partial charging and discharging cycle test as above for 5.4 months, then was subjected to charge to a voltage at which SOC reached 10%, and was left in a high temperature atmosphere at 60° C. for 0.6 months (the ratio of the cycle test period and the period left alone was 90:10). The battery C2 was subjected to the partial charging and discharging cycle test as above for 1.2 months, then was subjected to charge to a voltage at which SOC reached 10%, and was left in a high temperature atmosphere at 60° C. for 4.8 months (the ratio of the cycle test period and the period left alone was 20:80).

The battery C3 was subjected to the partial charging and discharging cycle test as above for 2.4 months, then was subjected to charge to a voltage at which SOC reached 10%, and was left in a high temperature atmosphere at 60° C. for 3.6 months (the ratio of the cycle test period and the period left alone was 40:60). The battery C4 was subjected to the partial charging and discharging cycle test as above for 3.0 months, then was subjected to charge to a voltage at which SOC reached 10%, and was left in a high temperature atmosphere at 60° C. for 3.0 months (the ratio of the cycle test period and the period left alone was 50:50). The battery C5 was subjected to the partial charging and discharging cycle test as above for 3.6 months, then was subjected to charge to a voltage at which SOC reached 10%, and was left in a normal temperature atmosphere at 25° C. for 14.4 months (the ratio of the cycle test period and the period left alone was 20:80).

The battery C6 was subjected to the partial charging and discharging cycle test as above for 9.0 months, then was subjected to charge to a voltage at which SOC reached 10%, and was left in a normal temperature atmosphere at 25° C. for 9.0 months (the ratio of the cycle test period and the period left alone was 50:50). The battery C7 was subjected to the partial charging and discharging cycle test as above for 2.4 months, then was subjected to charge to a voltage at which SOC reached 10%, and was left in a high temperature atmosphere at 45° C. for 9.6 months (the ratio of the cycle test period and the period left alone was 20:80).

Next, after the charging and discharging cycle test as above, each internal resistance value (direct-current resistance value: DCR) of the nickel-hydrogen storage batteries C1 to C7 was determined, and the ratio to the internal resistance value (direct-current resistance value: DCR) previously determined of the battery A was determined. Table 1 shows the results. After the charging and discharging cycle test and the storage test as above, these batteries C1 to C7 were subjected to charge at a charging current of 1 It to an SOC of 110%, and then were subjected to discharge at a discharging current of 1 It until the battery voltage reached 0.9 V. The battery capacity after the storage test was determined from the discharge time, and the ratio to the initial capacity previously determined was determined as the initial capacity ratio (ratio with respect to the battery A). Table 1 shows the results. Next, the nickel-hydrogen storage batteries C1 to C7 were disassembled, and the positive electrode active material of each battery was removed from the nickel positive electrode 11 in a similar method to the above. Subsequently, X-ray diffraction analysis using XRD and ICP analysis were performed to determine the half-width of the (101) plane peak, the half-width of the (100) plane peak, the half-width of the (001) plane peak, the ratio of the half-width of the (001) plane peak with respect to the half-width of the (100) plane peak, for Ni(OH)$_2$, and the aluminum (Al) content with respect to the mass of the positive electrode active material. Table 1 shows the results.

Figure 2:
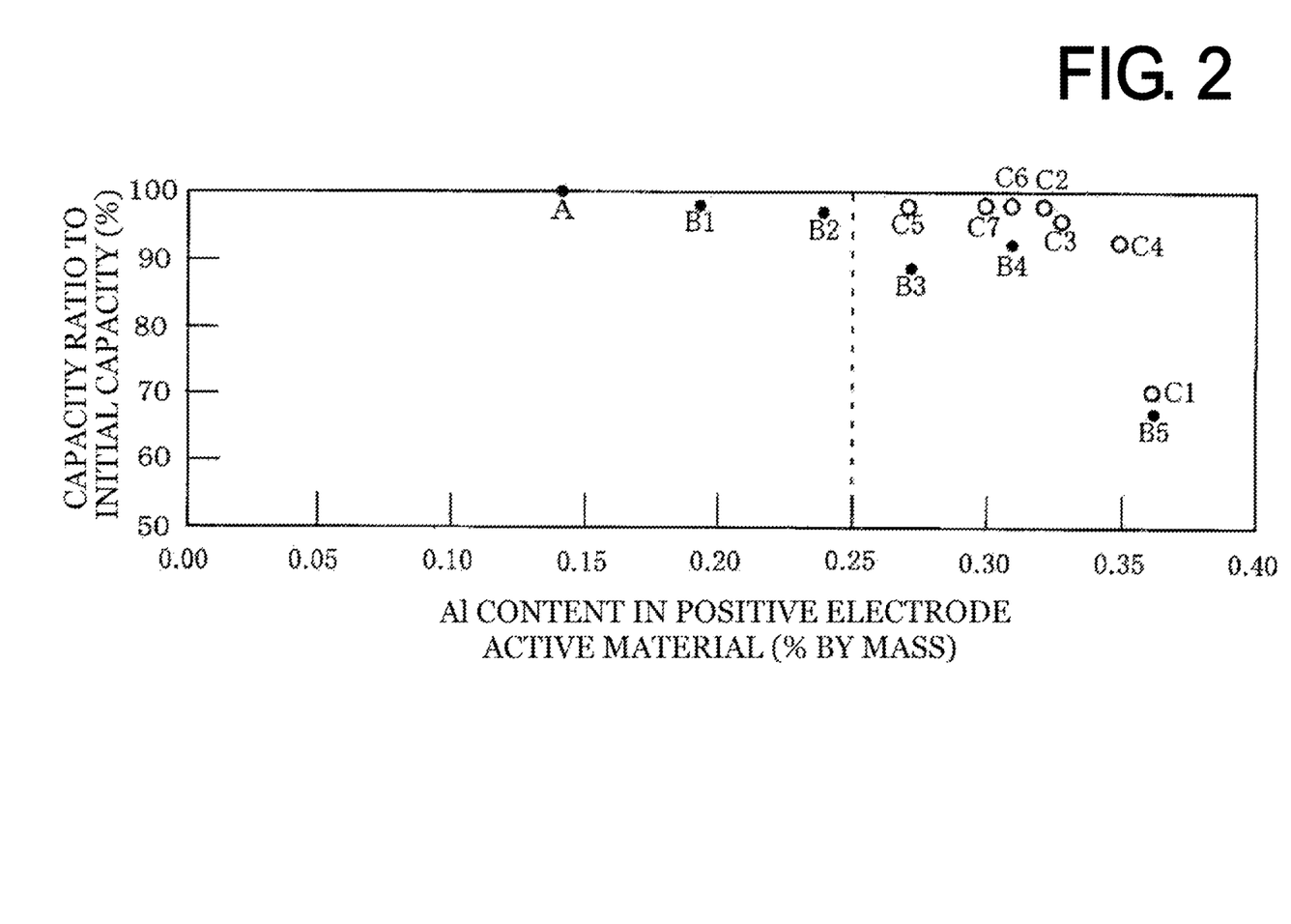
FIG. 2 is a graph showing the relation of capacity ratio (ratio with respect to initial capacity) (%) with respect to the Al content (% by mass) in a nickel positive electrode active material.
Figure 3:
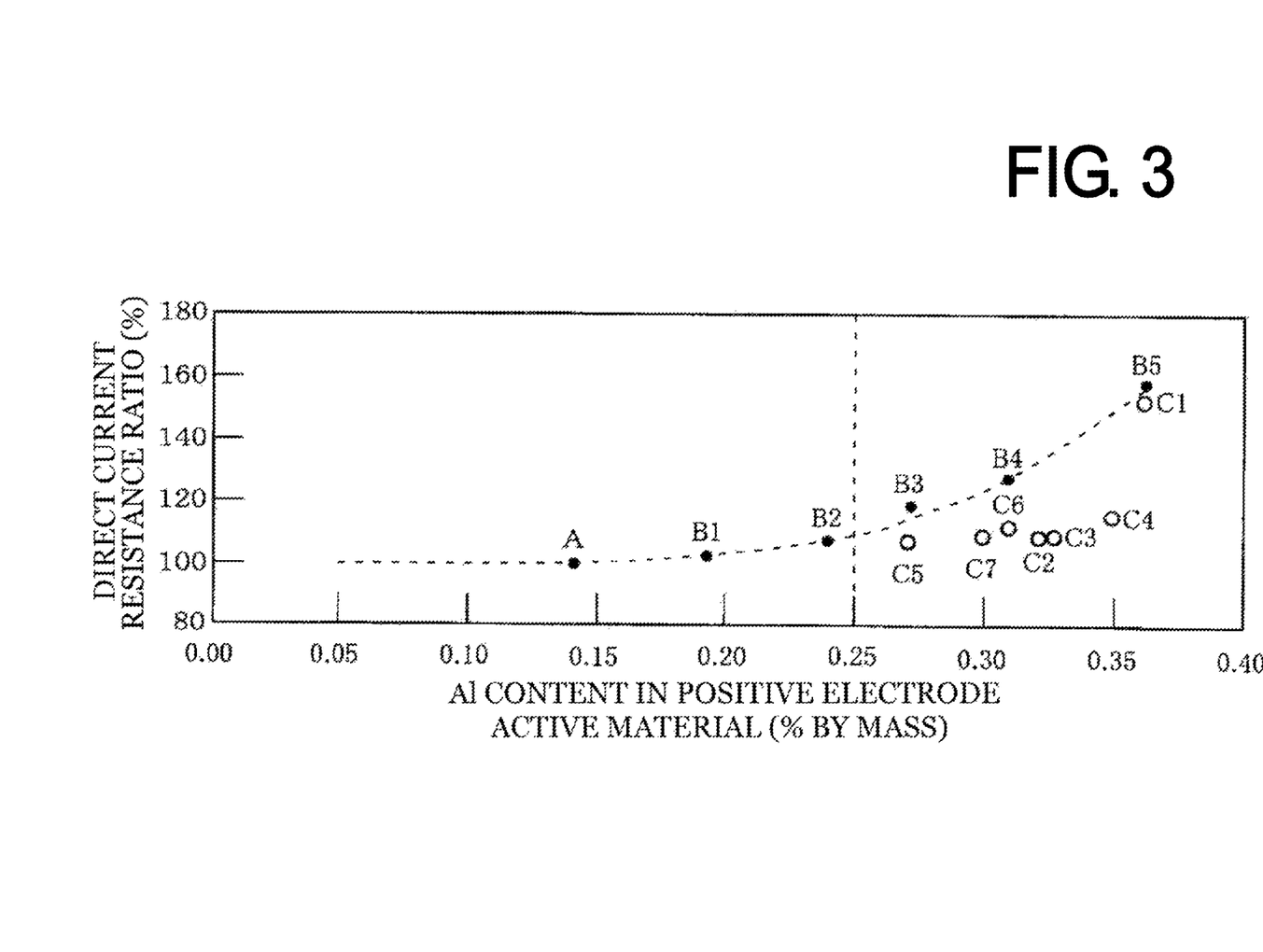
FIG. 3 is a graph showing the relation of battery resistance ratio (%) with respect to the Al content (% by mass) in the nickel positive electrode active material.
Figure 4:
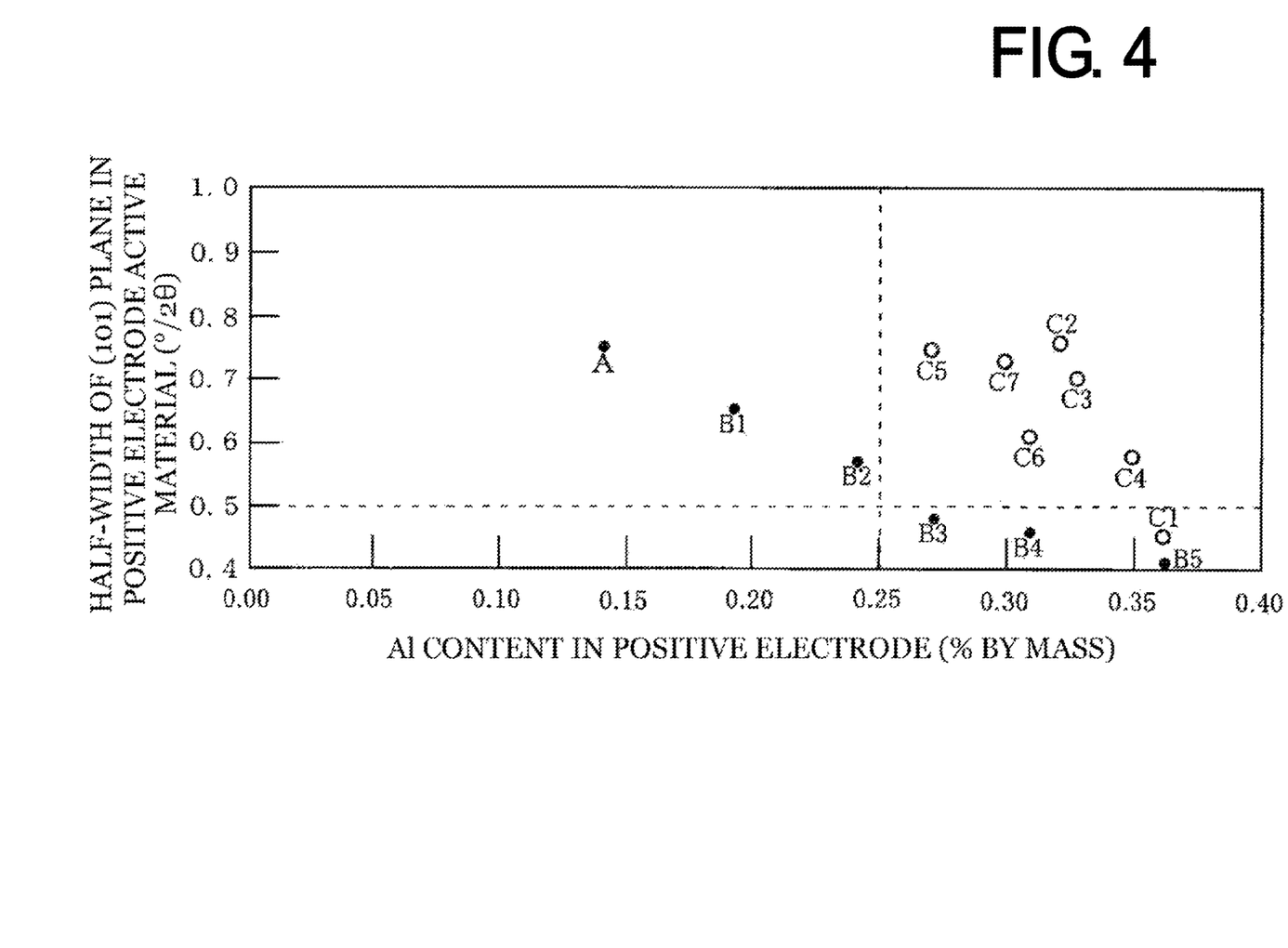
FIG. 4 is a graph showing the relation of a half-width (°/2θ) of the (101) plane peak for a positive electrode active material (nickel hydroxide (Ni(OH)$_2$)) with respect to the Al content (% by mass) in the nickel positive electrode active material.
Figure 5:
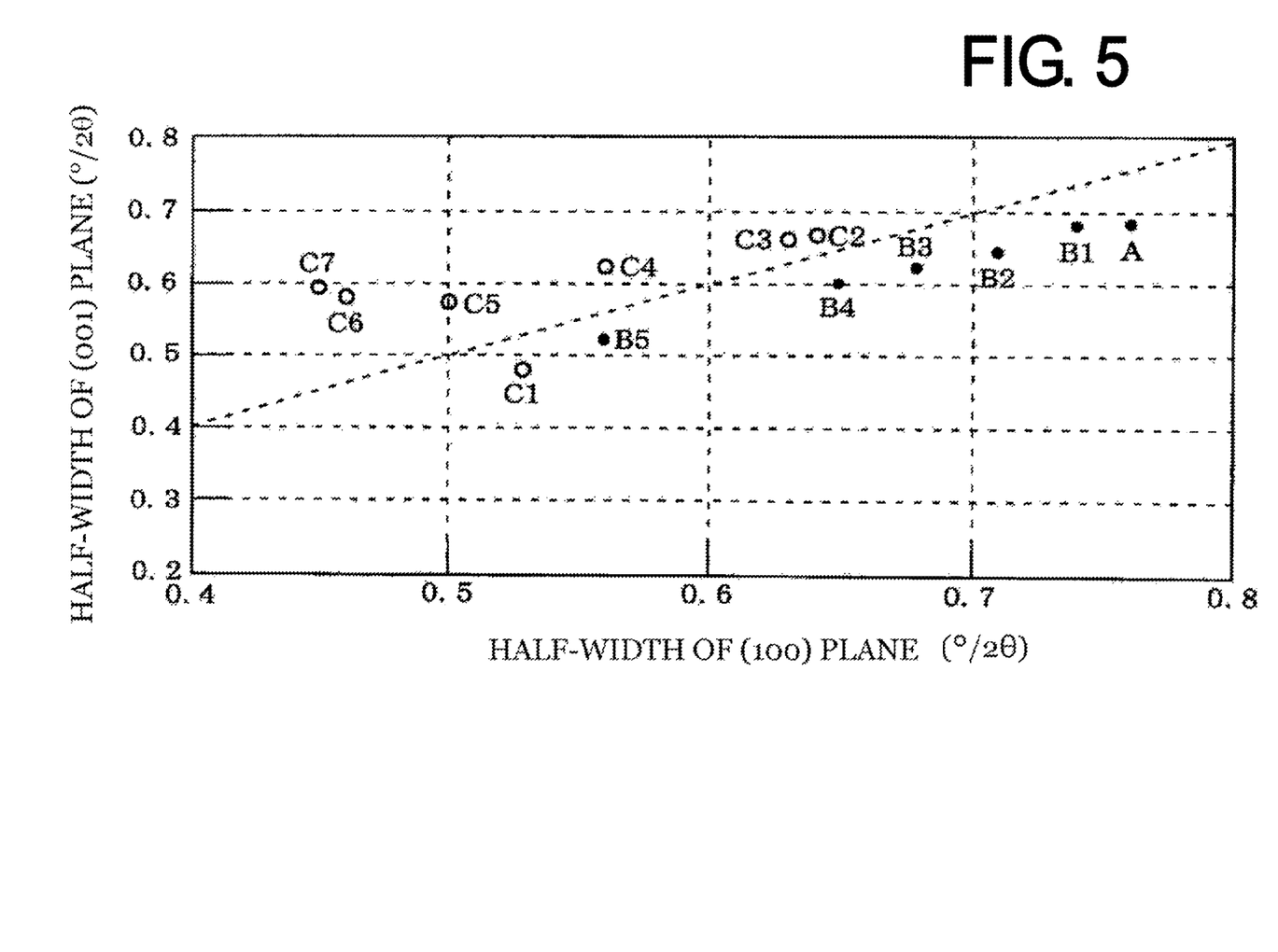
FIG. 5 is a graph showing the relation between a half-width (°/2θ) of the (100) plane peak and a half-width (°/2θ) of the (001) plane peak for the positive electrode active material (nickel hydroxide (Ni(OH)$_2$)) in the nickel positive electrode.

The results in Table 1 were plotted in a graph with the aluminum (Al) content in the positive electrode active material on the horizontal axis (X-axis) and the battery capacity ratio (%) on the vertical axis (Y-axis), which is shown in FIG. 2. The results in Table 1 were plotted in a graph with the aluminum (Al) content in the positive electrode active material on the horizontal axis (X-axis) and the battery resistance ratio (%) on the vertical axis (Y-axis), which is shown in FIG. 3. The results in Table 1 were plotted in a graph with the aluminum (Al) content in the positive electrode active material on the horizontal axis (X-axis) and the half-width of the (101) plane peak for nickel hydroxide (Ni(OH)$_2$) on the vertical axis (Y-axis), which is shown in FIG. 4. Furthermore, the results in Table 1 were plotted in a graph with the half-width of the (100) plane peak for nickel hydroxide (Ni(OH)$_2$) on the horizontal axis (X-axis) and the half-width of the (001) plane peak for nickel hydroxide (Ni(OH)$_2$) on the vertical axis (Y-axis), which is shown in FIG. 5. Table 1 also shows the result of the battery A.

TABLE 1

| | Cycle test | | Storage test | | Initial capacity ratio (to battery A) (%) | Direct current resistance ratio (to battery A) (%) | Content of positive electrode active material of nickel positive electrode | | | | |
|---|---|---|---|---|---|---|---|---|---|---|---|
| Battery type | Temperature (° C.) | Period (month) | Temperature (° C.) | Period (month) | | | Al content (% by mass) | Half-width of (101) plane (°/2θ) | Half-width of (100) plane (°/2θ) | Half-width of (001) plane (°/2θ) | Half-width ratio (001)/(100) |
| A | — | — | — | — | 100.0 | 100.0 | 0.14 | 0.75 | 0.76 | 0.68 | 0.89 |
| B1 | 45 | 1.0 | — | — | 99.2 | 102.1 | 0.18 | 0.65 | 0.74 | 0.68 | 0.92 |
| B2 | 45 | 3.0 | — | — | 97.8 | 103.9 | 0.24 | 0.57 | 0.71 | 0.64 | 0.90 |
| B3 | 45 | 4.0 | — | — | 89.3 | 119.3 | 0.27 | 0.48 | 0.68 | 0.62 | 0.91 |
| B4 | 45 | 5.0 | — | — | 92.9 | 126.9 | 0.31 | 0.46 | 0.65 | 0.60 | 0.92 |

TABLE 1-continued

| Battery type | Cycle test | | Storage test | | Initial capacity ratio (to battery A) (%) | Direct current resistance ratio (to battery A) (%) | Content of positive electrode active material of nickel positive electrode | | | | |
|---|---|---|---|---|---|---|---|---|---|---|---|
| | Temperature (°C.) | Period (month) | Temperature (°C.) | Period (month) | | | Al content (% by mass) | Half-width of (101) plane (°/2θ) | Half-width of (100) plane (°/2θ) | Half-width of (001) plane (°/2θ) | Half-width ratio (001)/(100) |
| B5 | 45 | 6.0 | — | — | 66.5 | 157.3 | 0.36 | 0.41 | 0.56 | 0.52 | 0.93 |
| C1 | 45 | 5.4 | 60 | 0.6 | 70.3 | 151.7 | 0.36 | 0.45 | 0.53 | 0.48 | 0.91 |
| C2 | 45 | 1.2 | 60 | 4.8 | 98.1 | 105.3 | 0.32 | 0.73 | 0.64 | 0.68 | 1.06 |
| C3 | 45 | 2.4 | 60 | 3.6 | 96.5 | 106.3 | 0.33 | 0.70 | 0.63 | 0.66 | 1.05 |
| C4 | 45 | 3.0 | 60 | 3.0 | 92.5 | 115.0 | 0.35 | 0.58 | 0.56 | 0.62 | 1.11 |
| C5 | 45 | 3.6 | 25 | 14.4 | 98.1 | 105.3 | 0.27 | 0.74 | 0.50 | 0.57 | 1.14 |
| C6 | 45 | 9.0 | 25 | 9.0 | 97.8 | 113.1 | 0.31 | 0.61 | 0.46 | 0.58 | 1.26 |
| C7 | 45 | 2.4 | 45 | 9.6 | 98.1 | 106.3 | 0.30 | 0.73 | 0.45 | 0.59 | 1.31 |

As apparent from the results of the battery A and the batteries B1 to B5 in Table 1, as the cycle test period increases, the aluminum (Al) content in the nickel positive electrode is likely to increase, and the capacity ratio with respect to the initial capacity is likely to decrease. The results also reveal that the aluminum (Al) content with respect to the mass of the positive electrode active material in the nickel positive electrode has a correlation with the half-width of the (101) plane peak for nickel hydroxide ($Ni(OH)_2$) as the positive electrode active material. Specifically, the results show that as the aluminum (Al) content in the nickel positive electrode increases, the half-width of the (101) plane peak for nickel hydroxide ($Ni(OH)_2$) as the positive electrode active material is likely to decrease accordingly. This means that the crystallizability of nickel hydroxide ($Ni(OH)_2$) is likely to increase, the positive electrode resistance is likely to increase, and the battery capacity is likely to decrease.

In this case, the results of the batteries A, B1, and B2 to B5 reveal that the battery capacity decreases very little when the aluminum (Al) content in a nickel positive electrode is less than 0.25% by mass with respect to the mass of the positive electrode active material. In contrast, as shown by the batteries B2 to B5, when the aluminum (Al) content in a nickel positive electrode is 0.25% by mass or greater with respect to the mass of the positive electrode active material, the half-width of the (101) plane peak for nickel hydroxide ($Ni(OH)_2$) is 0.5 (°/2θ) or less. This means that the crystallizability of nickel hydroxide ($Ni(OH)_2$) as the positive electrode active material increases, and the positive electrode resistance increases, resulting in the reduction in the battery capacity.

As shown by the battery C1, it is clear that when a period left alone is shorter than the cycle test period, the aluminum (Al) content in the nickel positive electrode is large. As the aluminum (Al) content in the nickel positive electrode increases, the half-width of the (101) plane peak for nickel hydroxide ($Ni(OH)_2$) largely decreases, which means that the crystallizability increases. Consequently, the positive electrode resistance increases, resulting in the reduction in the battery capacity.

In contrast, as shown by the battery C2 to battery C7, it is clear that when a period left alone is equal to or longer than the cycle test period, the reduction in the half-width of the (101) plane peak for nickel hydroxide ($Ni(OH)_2$) as the positive electrode active material is small, whereas the aluminum (Al) content in the nickel positive electrode increases. A small reduction in the half-width of the (101) plane peak for nickel hydroxide ($Ni(OH)_2$) leads to a small increase in the positive electrode resistance, resulting in a small reduction in the battery capacity.

Here, the factor of increasing the positive electrode resistance is as follows: aluminum (Al) from a hydrogen storage alloy as the negative electrode active material is taken into the nickel positive electrode, and consequently the aluminum (Al) content in the nickel positive electrode increases. This results in reduction in the half-width of the (101) plane peak for nickel hydroxide ($Ni(OH)_2$) as the positive electrode active material, which means increase in the crystallizability of the nickel hydroxide ($Ni(OH)_2$). The increased crystallizability of nickel hydroxide ($Ni(OH)_2$) causes difficulty for electrons to transfer in the positive electrode active material. This is believed to be a factor in increasing the positive electrode resistance. Thus, to suppress the increase in the positive electrode resistance, it is effective to maintain a large half-width of the (101) plane peak for nickel hydroxide ($Ni(OH)_2$) to suppress the increase in the crystallizability of nickel hydroxide ($Ni(OH)_2$).

As a result of the calculation of the ratio of the half-width of the (001) plane peak with respect to the half-width of the (100) plane peak, the batteries C2 to C7 have a peak half-width ratio of 1 or greater, whereas the batteries B1 to B5 and C1 have a ratio of the half-width of the (001) plane peak with respect to the half-width of the (100) plane peak of 1 or less. From these results, it is supposed that each crystal structure of nickel hydroxide in the battery C2 to C7 has lower crystallizability in the c-axis direction than that in the a-axis and has good electronic conduction, and thus the increase in positive electrode resistance is suppressed.

In consideration of all the results above, it is revealed that even when the aluminum (Al) content in a nickel positive electrode is 0.25% by mass or greater of the mass of the positive electrode active material, the increase in positive electrode resistance can be suppressed by maintaining the half-width of the (101) plane peak for nickel hydroxide ($Ni(OH)_2$) as the positive electrode active material to be 0.5 (°/2θ) or greater in powder X-ray diffraction using Cu—Kα and this can suppress the reduction in the battery capacity.

INDUSTRIAL APPLICABILITY

The embodiments above describe the nickel positive electrode containing aluminum (Al) at a content of only 0.14% by mass with respect to the mass of the positive electrode active material during preparation thereof. However, the aluminum (Al) content during the preparation is desirably 0.25% by mass or less. This is because an aluminum (Al) content of greater than 0.25% by mass during the preparation increases the crystallizability, and thus the increase in the positive electrode resistance cannot be suppressed after the charging and discharging cycle test.

The embodiments above describe the nickel positive electrode containing zinc (Zn) at a content of only 0.05% by mass with respect to the Ni atom of Ni(OH)$_2$ as the positive electrode active material during preparation thereof. However, the zinc (Zn) content is desirably 0.05% by mass or less with respect to the Ni atom of Ni(OH)$_2$ as the positive electrode active material. This is because a content of less than 0.05% by mass with respect to the Ni atom of Ni(OH)$_2$ as the positive electrode active material can reduce the crystallizability of Ni(OH)$_2$ and can suppress the increase in the positive electrode resistance after the charging and discharging cycle. In contrast, a content greater than 0.05% by mass with respect to the Ni atom of Ni(OH)$_2$ as the positive electrode active material increases the crystallizability of Ni(OH)$_2$ and maintains the high crystallizability after the charging and discharging cycle, thereby increasing the positive electrode resistance.

EXPLANATIONS OF LETTERS OR NUMERALS

11 Nickel electrode
11c substrate exposed portion
12 Hydrogen storage alloy electrode
12c Substrate exposed portion
13 Separator
14 Negative electrode collector
15 Positive electrode collector
15a Collector lead portion
17 Outer can
17a Annular groove
17b Open end
18 Sealing plate
18a Positive electrode cap
18b Valve plate
18c Spring
19 Insulating gasket

The invention claimed is:

1. An alkaline storage battery comprising a sealed battery container storing an electrode group including a hydrogen storage alloy negative electrode having a hydrogen storage alloy as a negative electrode active material, a nickel positive electrode having nickel hydroxide as a main component of a positive electrode active material, and a separator, and also storing an alkaline electrolyte,
the hydrogen storage alloy negative electrode containing aluminum (Al) and the nickel positive electrode also containing aluminum (Al),
the aluminum (Al) content in the nickel positive electrode being 0.25% to 0.35% by mass with respect to the mass of the positive electrode active material,
the half-width of the (101) plane peak for Ni(OH)$_2$ being 0.5 (°/2θ) or greater in powder X-ray diffraction of the positive electrode active material using Cu—Kα, and
the aluminum (Al) content gradually decreases from the surface of the nickel positive electrode toward the inside of the nickel positive electrode.

2. The alkaline storage battery according to claim 1, wherein
the half-width of the (001) plane peak for Ni(OH)$_2$ is larger than the half-width of the (100) plane peak in powder X-ray diffraction of the nickel positive electrode using Cu—Kα.

3. The alkaline storage battery according to claim 1, wherein
the nickel positive electrode contains zinc (Zn) at a content of 0.05% by mass or less with respect to the nickel (Ni) atom of nickel hydroxide (Ni(OH)$_2$) as the positive electrode active material.

4. The alkaline storage battery according to claim 1, wherein
the nickel positive electrode includes a layer containing aluminum (Al) from the surface of the positive electrode to a particular position.

5. An alkaline storage battery comprising a sealed battery container storing an electrode group including a hydrogen storage alloy negative electrode having a hydrogen storage alloy as a negative electrode active material, a nickel positive electrode having nickel hydroxide as a main component of a positive electrode active material, and a separator, and also storing an alkaline electrolyte,
the hydrogen storage alloy negative electrode containing aluminum (Al) and the nickel positive electrode also containing aluminum (Al),
the aluminum (Al) content in the nickel positive electrode being 0.25% to 0.35% by mass with respect to the mass of the positive electrode active material,
the half-width of the (101) plane peak for Ni(OH)$_2$ being 0.5 (°/2θ) or greater in powder X-ray diffraction of the positive electrode active material using Cu—Kα, and
the half-width of the (001) plane peak for Ni(OH)$_2$ is larger than the half-width of the (100) plane peak in powder X-ray diffraction of the nickel positive electrode using Cu—Kα.

6. The alkaline storage battery according to claim 5, wherein
the nickel positive electrode contains zinc (Zn) at a content of 0.05% by mass or less with respect to the nickel (Ni) atom of nickel hydroxide (Ni(OH)$_2$) as the positive electrode active material.

7. The alkaline storage battery according to claim 5, wherein
the aluminum (Al) content gradually decreases from the surface of the nickel positive electrode toward the inside of the nickel positive electrode.

8. The alkaline storage battery according to claim 5, wherein
the nickel positive electrode includes a layer containing aluminum (Al) from the surface of the positive electrode to a particular position.

9. An alkaline storage battery comprising a sealed battery container storing an electrode group including a hydrogen storage alloy negative electrode having a hydrogen storage alloy as a negative electrode active material, a nickel positive electrode having nickel hydroxide as a main component of a positive electrode active material, and a separator, and also storing an alkaline electrolyte,
the hydrogen storage alloy negative electrode containing aluminum (Al) and the nickel positive electrode also containing aluminum (Al),
the aluminum (Al) content in the nickel positive electrode being 0.25% by mass or greater with respect to the mass of the positive electrode active material,
the half-width of the (101) plane peak for Ni(OH)$_2$ being 0.5 to 0.61 (°/2θ) in powder X-ray diffraction of the positive electrode active material using Cu—Kα, and
the aluminum (Al) content gradually decreases from the surface of the nickel positive electrode toward the inside of the nickel positive electrode.

10. The alkaline storage battery according to claim 1, wherein the half-width of the (101) plane peak for Ni(OH)$_2$ being 0.5 to 0.61 (°/2θ) in powder X-ray diffraction of positive electrode active material using Cu—Kα.

11. The alkaline storage battery according to claim 5, wherein the half-width of the (101) plane peak for Ni(OH)$_2$ being 0.5 to 0.61 (°/2θ) in powder X-ray diffraction of the positive electrode active material using Cu—Kα.

* * * * *